United States Patent [19]

Leonardo

[11] Patent Number: 4,501,400
[45] Date of Patent: * Feb. 26, 1985

[54] CABLE-CLAMP

[75] Inventor: Ignazio Leonardo, Mountainside, N.J.

[73] Assignee: Diamond Communication Products, Inc., Garwood, N.J.

[*] Notice: The portion of the term of this patent subsequent to Aug. 21, 2001 has been disclaimed.

[21] Appl. No.: 329,410

[22] Filed: Dec. 10, 1981

[51] Int. Cl.³ .............................................. F16L 3/08
[52] U.S. Cl. .................................. 248/74.1; 248/74.2; 248/316.1
[58] Field of Search ............... 248/74.3, 74.8, 74.7, 248/74.1, 73, 544, 259, 219.3, 316 R

[56] References Cited

U.S. PATENT DOCUMENTS

| | | | |
|---|---|---|---|
| 2,485,406 | 10/1949 | Paine | 248/259 |
| 3,385,545 | 5/1968 | Patton | 248/316 R |
| 3,544,053 | 12/1970 | Ingalls | 248/219.3 |
| 3,692,266 | 9/1972 | Jacobs | 248/544 |
| 4,168,423 | 9/1979 | Gilreath | 248/74.3 |

FOREIGN PATENT DOCUMENTS

| | | | |
|---|---|---|---|
| 0607641 | 1/1935 | Fed. Rep. of Germany | 248/323 |
| 2385966 | 1/1978 | France | 248/74.3 |

*Primary Examiner*—William H. Schultz
*Assistant Examiner*—Ramon O. Ramirez
*Attorney, Agent, or Firm*—Hopgood, Calimafde, Kalil, Blaustein & Judlowe

[57] ABSTRACT

The invention contemplates a unitary cable-clamp fitting adapted for clamped above-ground suspension of a cable from a telephone pole or the like. The fitting comprises two elongate side panels integrally connected by an elongate single bend, establishing an initially acute angle between the side panels. The outer longitudinal edge of each panel is characterized by an elongate flange bent inward and generally toward the opposed side panel, at an acute angle to its associated side panel. The initial space between flanges is slightly less than the cable diameter to be accommodated, so that cable assembly and loose retention are achieved via snap-action insertion between the flanges. Bolts spanning aligned apertures in the side panels enable secure clamping to, and lug-retention against loss of, an inserted cable.

16 Claims, 4 Drawing Figures

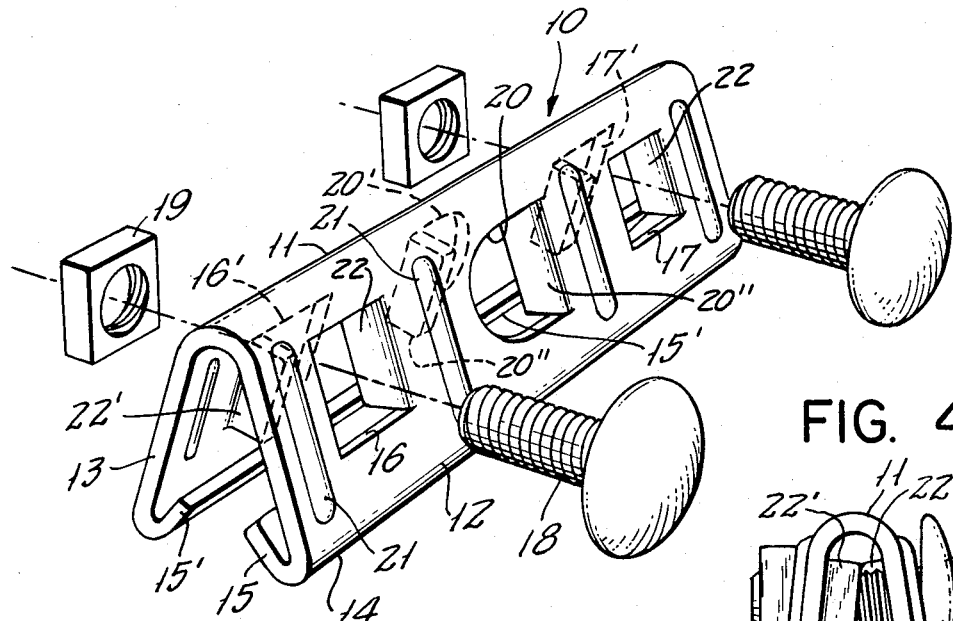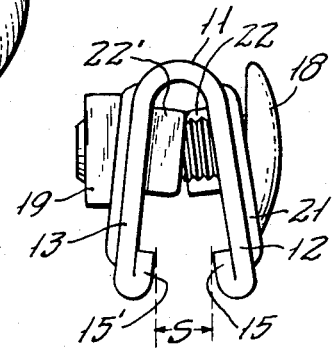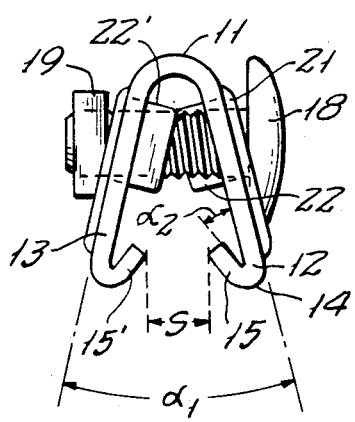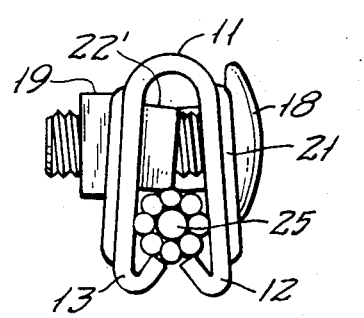

CABLE-CLAMP

BACKGROUND OF THE INVENTION

The invention relates to a cable-clamp fixture suited for above-ground suspension of a cable, as from a telephone pole.

Current above-ground suspension of communication cable, as for telephone or cable-TV purposes, relies upon a suspension cable, as of stranded steel wire which is tensed in its slings, as from pole to pole, and the communication cable hangs beneath the suspension cable via a series of more closely spaced bails. At each pole connection of the tensed suspension cable, a clamp fixture is set to the tensed cable, and the fixture is anchored to the pole. It has been the practice to employ a clamp-fixture construction involving at least two separate elongate side plates with aligned bolt apertures, one or both plates having one or more elongate narrow stiffening flanges along one or both of its elongate edges. When clamped and pole-mounted, such fixtures serve their purpose of maintaining tension in adjacent slings of the suspension cable, but manipulation of the parts of the fixture during the process of assembly to a cable and to a pole is not as simple as I have discovered that is now possible, with my invention.

BRIEF STATEMENT OF THE INVENTION

It is an object of the invention to provide an improved suspension-cable clamp of the character indicated.

Another object is to provide such a clamp with mechanical features which materially simplify installation.

It is a general object to meet the above objects with a clamp construction which is less expensive to manufacture and to install, and which does not sacrifice clamping efficacy, as compared to existing clamp configurations.

The invention achieves the foregoing objects and certain further features in a one-piece formed sheet-metal clamp construction, wherein two elongate side panels are integrally connected by an elongate single bend, establishing an initially acute angle between the side panels. In one form, the outer longitudinal edge of each panel is characterized by an elongate flange bent inward and generally toward the opposed side panel, at an acute angle to its associated side panel; in another form, the elongate flanges are bent inward to the point of substantially zero angle to the associated side panel. The initial space between flanges is slightly less than the cable diameter to be accommodated, so that cable assembly and loose retention are achieved via snap-action insertion between the flanges. Bolts spanning aligned apertures in the side panels enable secure clamping to, and lug-retention against loss of, an inserted cable.

DETAILED DESCRIPTION

The invention will be illustratively described in detail in conjunction with the accompanying drawings, in which:

FIG. 1 is an exploded view in perspective of a cable-clamp fitting of the invention;

FIG. 2 is an end view of the assembled fitting of FIG. 1;

FIG. 3 is a view similar to FIG. 2, for the cable-clamped condition of the fitting of FIG. 1; and FIG. 4 is a view similar to FIG. 2, to show a modification.

The article of FIG. 1 comprises a single unitary elongate clamp body 10 of formed stiff sheet metal such as cold-rolled sheet, it being my present preference to fabricate body 10 from coiled strip of width which matches the elongate dimension of body 10. The blank from which body 10 is formed is rectangular, being bent along a central longitudinal alignment to define an upper edge 11 by which two elongate rectangular side panels 12-13 are integrally connected, at an initially acute angle $\alpha_1$. The lower or outer longitudinal edge of each panel, such as the edge 14 of panel 12, is integrally formed with a re-entrant inturned elongate lug 15, which is initially formed at an acute angle $\alpha_2$ to the associated side panel (12); the corresponding such lug at the lower edge of side panel 13 is identified 15'.

The angle $\alpha_1$ may suitably be in the range of 25° to 40° and is preferably about 30°, while the angle $\alpha_2$ may suitably be in the range of 0° to 25° and is preferably about 15°, the zero-degree situation being shown in FIG. 4, wherein flanges 15-15' are substantially flattened to their associated panels 12-13. Whatever the angles $\alpha_1$ and/or $\alpha_2$, the initial span S between longitudinal flanges 15-15' is preferably slightly less than the effective diameter of the suspension cable to which it is to be assembled and clamped, whereby cable entry past lugs 15-15' involves snap-action and therefore an initial loose retention of assembly to the cable. Further preferably, the inside radius R of the bend 11 is slightly less than half the cable diameter.

The side panels 12-13 have longitudinally spaced bolt apertures 16-17 (16'-17') at corresponding locations, for preassembled loose reception of a clamping bolt 18 and nut 19 at each pair of corresponding bolt apertures 16-16' (17-17'). At their longitudinal center, panels 12-13 have a further pair of corresponding apertures 20-20', for suitably pinned or bolted anchorage to an above-ground support, such as a telephone pole; apertures 20-20' are shown D-shaped, with a short internal lug 20" formed inwardly of the straight edge of each D-shaped opening, and with their respective inturned lugs 20" in longitudinally offset relation. Preferably, transverse stiffening ribs 21 are formed in each of panels 12-13, on opposite sides of each aperture, and bolt apertures 16-17 (16'-17') are square, for keying reference to a carriage bolt 18 at each bolt-clamping location. As shown, a short inward lug 22 along one of the transverse edges of each bolt aperture 16-17 provides further local stiffening action and, as will later appear, provides a transverse positioning limit for cable insertion, it will be understood that a corresponding transverse lug 22' at each bolt aperture 16'-17' in panel 13 may be along the transverse edge which is longitudinally opposite the transverse-edge location for the corresponding lug 22 of panel 12. Lugs 22-22' and 20" are thus provided in longitudinally interlaced relation; and they are preferably of inturned extent short of the ultimately clamped inside separation between panels 12-13.

The described fitting is preferably supplied to the linesman or installer in a loosely assembled relation of nutted bolts 18 to the unitary folded-plate element 10, the size being prescribed for the stated relation between span S and the size of cable 25 to which the fitting is to be clamped. Initial assembly is a simple one-handed snap-action event, followed by pin location to the pole or other support via apertures 20-20'. When the cable has been tensed to assure the desired sling between poles, the completion of each clamp action is again a simple one-handed operation, as by ratchet wrench to each nut 19. When securely clamped, the cable 25 will become locally slightly compressed, as is apparent from FIG. 3, and side panels 12–13 will be in a substantially parallel relation. It will be noted that when thus clamped, lugs 15–15' will have closed the gap S and will have become slightly compressed in a reduction of their angles $\alpha_2$, but that thus-compressed against each other, lugs 15–15' become a well-reinforced permanent barrier against cable loss.

In a typical clamp configuration, suited for accommodation of ¼-inch diameter stranded cable, the gap S is 0.225 inch, and the inside radius of the central bend 11 is 0.109 inch.

While the invention has been described in detail for a preferred form, it will be understood that modifications may be made without departure from the scope of the invention.

What is claimed is:

1. A cable-suspension fitting for clamped suspension of a given-diameter cable from a telephone pole or the like, comprising a unitary elongate stiff metal clamp having two elongate side panels integrally connected via a single longitudinal bend and divergent at an acute angle to their outer longitudinal edges, each side panel having at its outer longitudinal edge an inwardly bent flange of width less than side-panel width and oriented at an acute angle to its associated side panel, the inner limiting edges of said flanges being spaced from each other to an extent slightly less than said given diameter, whereby said clamp may be applied to the cable with snap action via the space between said flanges, said side panels having plural longitudinally spaced bolt apertures at corresponding locations between the longitudinal bend and the flanges, there being a clear unimpeded alignment of single geometric elongate cylindrical shape through both of the corresponding apertures of each pair, whereby a bolt through each pair of corresponding apertures may be set with a coacting nut to draw said panels to each other in clamped engagement with the cable and with said flanges establishing a permanent barrier against loss of the cable from the fitting.

2. The fitting of claim 1, in which each of said panels has a longitudinally central mounting aperture, said bolt apertures being at longitudinally symmetrical offsets from said mounting apertures.

3. The fitting of claim 1, in which each bolt aperture is square, for keyed reception of a carriage bolt.

4. The fitting of claim 3, in which each bolt aperture has two opposed edges extending transversely of its side panel, at least one transverse edge of each bolt aperture of one panel being defined by the inward bend of a lug projecting toward the other panel.

5. The fitting of claim 4, in which said aperture lugs of one panel are in staggered interlace with the aperture lugs of the other panel.

6. The fitting of claim 1, in which the inside radius of the longitudinal bend which connects said panels is of slightly less than the cable radius, whereby when bolt-clamped to the cable, said panels are in substantially parallel relation.

7. The fitting of claim 1, in which each panel has a plurality of transverse stiffening-rib formations at longitudinal locations on opposite sides of said bolt apertures.

8. As an article of manufacture, the fitting of claim 2 with an engaged nut and associated bolt spanning each pair of corresponding bolt apertures, said nut-and-bolt engagements being initially less than sufficient to reduce the space between said flanges, whereby the complete fitting may be assembled by snap action to the cable and may be loosely flange-retained against separation from the cable, until an installer becomes satisfied with the sling of the cable and sets the bolts to secure the sling.

9. The article of claim 8, in which the bolt apertures are square and the bolts are carriage bolts having keyed engagement to the square openings.

10. The fitting of claim 1, in which the metal of said clamp is cold-rolled steel.

11. A cable-suspension fitting for clamped suspension of a given-diameter cable from a telephone pole or the like, comprising a unitary elongate stiff metal clamp having two elongate side panels integrally connected via a single longtudinal bend and divergent at an acute angle to their outer longitudinal edged, each side panel having at its outer longitudinal edge an inwardly bent flange of width less than side-panel width and oriented at an acute angle to its associated side panel, the inner limiting edges of said flanges being spaced from each other to an extent slightly less than said given diameter, whereby said clamp may be applied to the cable with snap action via the space between said flanges, said side panels having a longtidinally central mounting aperture and plural longitudinally spaced bolt apertures at corresponding locations which are between the longitudinal bend and the flanges and which are at longitudinally symmetrical offsets from said mounting apertures, whereby a bolt through each pair of corresponding apertures may be set with a coacting nut to draw said panels to each other in clamped engagement with the cable and with said flanges establishing a permenant barrier against loss of the cable from the fitting, and each central mounting aperture being D-shaped, with an integral inturned lug extending from the straight leg of the D-shape.

12. The fitting of claim 11, in which the straight legs of the respective D-shapes are on opposite longitudinal sides of the associated D-shaped opening.

13. The fitting of claim 1, in which each of said flanges forms an acute angle with its associated side panel.

14. The fitting of claim 1, in which each of said flanges is folded back against the inner surface of its associated side panel.

15. A suspension-cable fitting for clamped assembly in combination with a given-diameter longitudinally extending messenger wire or the like cable, comprising a unitary stiff metal clamp having two side panels integrally connected via a single longitudinal bend and divergent at an acute angle to their outer longitudinal edges, each side panel having at its outer longitudinal edge a reversely and inwardly bent flange of length less than side-panel length and oriented at an acute angle to its associated side panel, the inner limiting edges of said flanges being spaced from each other to an extent slightly less than said given diameter, whereby said clamp may be applied to the cable with snap action via the space between said flanges, each of said side panels having a bolt-shank aperture at corresponding locations and on an alignment spanning the space between side panels and at offset from the associated one of said flanges, said offsets between the bolt-shank aperture alignment and the reversely bent flanges being substantially equal to the cable diameter, whereby a bolt-shank through said apertures may be set with a coacting nut to draw said panels to each other in clamped engagement with the cable and with said flanges trapping the cable and establishing a permanent barrier against loss of the cable from the fitting.

16. A suspension-cable fitting for clamped assembly in combination with a given-diameter longitudinally extending messenger wire or the like cable, comprising a unitary stiff metal clamp having two side panels integrally connected via a single longitudinal bend and divergent at an acute angle to their outer longitudinal edges, each side panel having at its outer longitudinal edge a reversely and inwardly bent flange of length less than side-panel length and oriented at an acute angle to its associated side panel, the inner limiting edges of said flanges being spaced from each other to an extent slightly less than said given diameter, and an engaged nut and bolt with the shank of the bolt through said apertures, said reversely bent flanges being offset from the bolt shank to substantially the extent of the cable diameter, whereby the nut and bolt may be set to draw said panels to each other in clamped engagement with the cable and with said flanges trapping the cable and establishing a permenant barrier against loss of the cable from the fitting.

* * * * *